(12) United States Patent
Makhmut et al.

(10) Patent No.: US 9,263,766 B2
(45) Date of Patent: Feb. 16, 2016

(54) ADDITIVE FOR ELECTROLYTE OF LITHIUM BATTERY, ORGANIC ELECTROLYTE SOLUTION COMPRISING THE SAME, AND LITHIUM BATTERY USING THE ORGANIC ELECTROLYTE SOLUTION

(71) Applicant: SAMSUNG SDI CO., LTD., Yongin-si, Gyeonggi-do (KR)

(72) Inventors: Khasanov Makhmut, Yongin-si (KR); Sang-Hoon Kim, Yongin-si (KR); Ha-Rim Lee, Yongin-si (KR); Pavel Alexandrovich Shatunov, Yongin-si (KR); In-Haeng Cho, Yongin-si (KR); Woo-Cheol Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 108 days.

(21) Appl. No.: 14/151,750

(22) Filed: Jan. 9, 2014

(65) Prior Publication Data

US 2015/0086861 A1    Mar. 26, 2015

(30) Foreign Application Priority Data

Sep. 24, 2013   (KR) .......................... 10-2013-0113480

(51) Int. Cl.
| | |
|---|---|
| *H01M 4/587* | (2010.01) |
| *H01M 10/0525* | (2010.01) |
| *H01M 10/0567* | (2010.01) |
| *H01M 10/0569* | (2010.01) |

(52) U.S. Cl.
CPC .......... *H01M 10/0567* (2013.01); *H01M 4/587* (2013.01); *H01M 10/0525* (2013.01); *H01M 10/0569* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 3,689,438 A | 9/1972 | Bourat et al. | |
| 4,064,167 A * | 12/1977 | DuBois et al. | 562/42 |
| 5,626,981 A | 5/1997 | Simon et al. | |
| 6,033,809 A | 3/2000 | Hamamoto et al. | |
| 6,291,107 B1 | 9/2001 | Shimizu | |
| 6,436,582 B1 * | 8/2002 | Hamamoto et al. | 429/340 |
| 7,163,768 B2 * | 1/2007 | Utsugi et al. | 429/340 |
| 2006/0134527 A1 | 6/2006 | Amine et al. | |
| 2012/0220785 A1 * | 8/2012 | Bouteiller | 549/40 |
| 2012/0288769 A1 | 11/2012 | Kono et al. | |

FOREIGN PATENT DOCUMENTS

| | | |
|---|---|---|
| EP | 2500975 A1 * | 9/2012 |
| JP | 07-282845 | 10/1995 |
| JP | 2007-258103 | 10/2007 |

OTHER PUBLICATIONS

Goethals, E., et al., The Disultone of 2.2-Dihydroxymethyl-1.3-Propane Disulphonic Acid, Bull. Soc. Chim. Belg., 70, 1961, pp. 218-220.

Peled, E., The Electrochemical Behavior of Alkali and Alkaline Earth Metals in Nonaqueous Battery Systems—The Solid Electrolyte Interphase Model, Journal of Electrochemical Society, Electrochemical Science and Technology, 126, 1979, pp. 2047-2051.

Xu, K., et al., Interfacing Electrolytes with Electrodes in Li Ion Batteries, Journal of Materials Chemistry, vol. 21, Feb. 7, 2011, pp. 9849-9864.

2,7-dioxa-3, 8-dithiaspiro [4.4] nonane 3, 3, 8, 8-tetraoxide-Compound summary, http://pubchem.ncbi.nlm.nih.gov/summary/summary.cgi?cid=248367.

EPO Search Report dated Feb. 5, 2015, for corresponding European Patent application 14177532.0, (7 pages).

Patent Abstracts of Japan, and English machine translation of Japanese Publication 07-282845 dated Oct. 27, 1995, listed above, (13 pages).

Patent Abstracts of Japan, and English machine translation of Japanese Publication 2007-258103 dated Oct. 4, 1997, listed above, (38 pages).

* cited by examiner

*Primary Examiner* — Gregg Cantelmo
(74) *Attorney, Agent, or Firm* — Lewis Roca Rothgerber Christie LLP

(57) ABSTRACT

An additive for an electrolyte of a lithium battery including a disultone-based compound represented by Formula 1 below, an organic electrolyte solution including the additive, and a lithium battery including the organic electrolyte solution are provided:

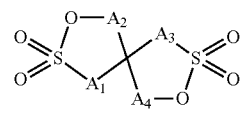

Formula 1 wherein, in Formula 1, $A_1$, $A_2$, $A_3$, and $A_4$ are each independently a substituted or unsubstituted C1-C5 alkylene group; a carbonyl group; or a sulfinyl group.

17 Claims, 2 Drawing Sheets

ADDITIVE FOR ELECTROLYTE OF LITHIUM BATTERY, ORGANIC ELECTROLYTE SOLUTION COMPRISING THE SAME, AND LITHIUM BATTERY USING THE ORGANIC ELECTROLYTE SOLUTION

CROSS-REFERENCE TO RELATED APPLICATION

This application claims priority to and the benefit of Korean Patent Application No. 10-2013-0113480, filed on Sep. 24, 2013, in the Korean Intellectual Property Office, the content of which is incorporated herein in its entirety by reference.

BACKGROUND

1. Field

One or more embodiments of the present invention relate to an additive for an electrolyte of a lithium secondary battery, an organic electrolyte solution including the additive, and a lithium battery including the organic electrolyte solution.

2. Description of the Related Art

Lithium batteries are used as driving (energy) sources of portable electronic devices, such as camcorders, mobile phones, and laptop computers. Lithium secondary batteries are rechargeable at high rates and have a high energy density per unit weight (about three times higher than that of the conventional lead storage batteries, nickel-cadmium (Ni—Cd) batteries, nickel-hydrogen batteries, or nickel-zinc batteries).

A lithium battery operating at a high driving voltage is incompatible with an aqueous electrolyte solution highly reactive to lithium. For this reason, the lithium battery normally uses an organic electrolyte solution. The organic electrolyte solution may be prepared by dissolving a lithium salt in an organic solvent. An appropriate organic solvent may be stable at high voltages, may have a high ionic conductivity, a high dielectric constant, and a low viscosity.

Using a carbonate-based polar or non-aqueous solvent in a lithium battery may cause a side reaction between an anode (and/or a cathode) and an electrolyte solution during initial charging, and consequentially lead to an irreversible reaction using excess charges.

The irreversible reaction may result in a passivation layer such as a solid electrolyte interface (SEI) layer on a surface of the anode. The SEI layer may prevent decomposition of the electrolyte and also serve as an ion channel. The higher the stability of the SEI layer and the lower the resistance of the SEI layer, the longer the the lithium battery life may be.

The irreversible reaction may also form a protection layer on a surface of the cathode. The protection layer may prevent decomposition of the electrolyte solution and also serve as an ion channel. The higher the stability of the protection layer at high temperature, the longer the lithium battery life may be.

A variety of additives are used to stabilize the SEI layer and/or the protective layer. However, when a conventional additive is used, the SEI layer may be prone to deterioration at high temperatures. That is, the SEI layer and/or the protection layer may have poor stability at high temperatures.

Therefore, there is a demand for an organic electrolyte solution for forming an SEI layer and/or protective layer with improved stability at high temperatures.

SUMMARY

An aspect of one or more embodiments of the present invention is directed toward a novel additive for an electrolyte of a lithium battery.

An aspect of one or more embodiments of the present invention is directed toward an organic electrolyte solution including the additive.

An aspect of one or more embodiments of the present invention is directed toward a lithium battery including the organic electrolyte solution.

Additional aspects will be set forth in part in the description which follows and, in part, will be apparent from the description, or may be learned by practice of the presented embodiments.

According to one or more embodiments of the present invention, an additive for lithium battery electrolyte includes a disultone-based compound represented by Formula 1 below:

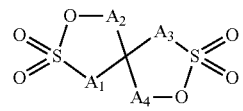

Formula 1 wherein, in Formula 1, $A_1$, $A_2$, $A_3$, and $A_4$ are each independently a substituted or unsubstituted C1-C5 alkylene group; a carbonyl group; or a sulfinyl group.

According to one or more embodiments of the present invention, an organic electrolyte solution includes: a lithium salt; an organic solvent; and the above-described additive.

According to one or more embodiments of the present invention, a lithium battery includes: a cathode; an anode; and the above-described organic electrolyte solution.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
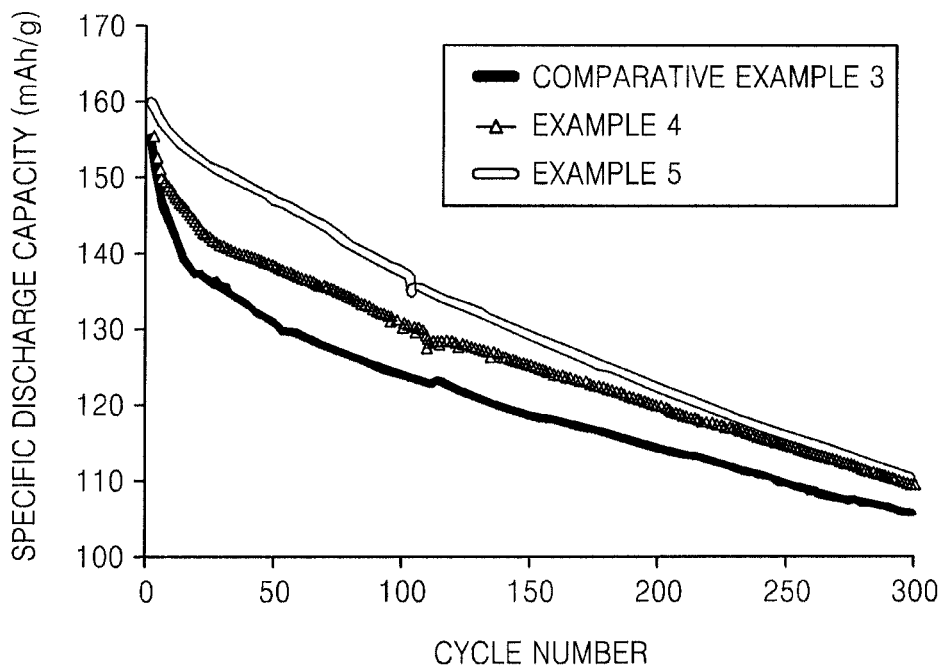
FIG. 1 is a graph illustrating lifetime characteristics of lithium batteries of Examples 4 and 5 and Comparative Example 3.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, one or more embodiments of an additive for an electrolyte of a lithium secondary battery, an organic electrolyte solution including the additive, and a lithium battery including the organic electrolyte solution will now be described in greater detail.

According to an embodiment of the present invention, there is provided an additive for an electrolyte of a lithium battery, the additive including a disultone-based compound represented by Formula 1 below:

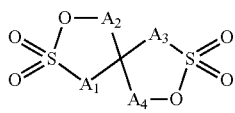

Formula 1

In Formula 1 above, $A_1$, $A_2$, $A_3$, and $A_4$ are each independently a substituent of a substituted or unsubstituted C1-C5 alkylene group; a carbonyl group; or a sulfinyl group.

The disultone-based compound of Formula 1 above as an additive for an electrolyte solution of a lithium battery may improve performance of the lithium battery, for example, in terms of battery life. The disultone-based compound of Formula 1 above may have a structure with two sultone rings connected in spiro form.

Hereinafter, the reason for which performance of a lithium battery is improved by addition of the disultone-based compound of Formula 1 into the electrolyte solution of the lithium battery will be described in greater detail. This is for the purpose of better understanding of the present invention and is not intended to limit the scope of the invention.

A sulfonate ester group included in the disultone-based compound of Formula 1 above may be reduced by itself by accepting electrons from a surface of an anode during charging, or may react with a previously reduced polar solvent molecule, thereby affecting characteristics of an SEI layer formed on the surface of the anode. For example, the disultone-based compound of Formula 1 above including the sulfonate ester group may more likely accept electrons from the anode, compared to polar solvents. That is, the disultone-based compound of Formula 1 above may be reduced at a lower voltage than a polar solvent before the polar solvent is oxidized.

For example, the disultone-based compound of Formula 1 above including the sulfonate ester group is more apt to be reduced or decomposed into radicals and/or ions during charging. Consequently, the radicals and/or ions may bind with lithium ions to form an appropriate SEI layer on the anode, thereby preventing further decomposition of the solvent. The disultone-based compound of Formula 1 above may form a covalent bond with, for example, a carbonaceous anode itself or a variety of functional groups on the surface of the carbonaceous anode, or may be adsorbed onto the surface of the anode, thereby forming a modified SEI layer with improved stability. The modified SEI layer formed by such binding and/or adsorption may be more durable even after charging and discharging for multiple cycles, compared to an SEI layer formed from only an organic solvent. The more stable modified SEI layer may in turn more effectively block co-intercalation of the organic solvent solvating lithium ions during intercalation of the lithium ions into the anode. Accordingly, the modified SEI layer may more effectively block direct contact between the organic solvent and the anode to further improve reversibility of intercalation and deintercalation of lithium ions, and consequently improve the discharge capacity and the battery life.

Alternatively, due to the inclusion of the sulfonate ester group, the disultone-based compound of Formula 1 above may be coordinated on a surface of a cathode, thereby affecting characteristics of a protection layer formed on the surface of the cathode. For example, the sulfonate ester group may form a complex by being coordinated by transition metal ions. This complex may form a modified protection layer with improved stability that is more durable even after charging and discharging for a long time than a protection layer formed from only the organic solvent. The modified stable protection layer may more effectively block co-intercalation of the organic solvent solvating lithium ions during intercalation of the lithium ions. Accordingly, the modified protection layer may more effectively block direct contact between the organic solvent and the cathode to further improve the reversibility of intercalation and deintercalation of lithium ions, and consequently improve stability and the battery life.

The disultone-based compound of Formula 1 above may have a relatively larger molecular weight than a corresponding single sultone-based compound because a plurality of rings are linked in spiro form, and thus may be more thermally stable.

In other words, the disultone-based compound of Formula 1 above may form an SEI layer on a surface of the anode, and a protection layer on a surface of the cathode, thereby improving the lithium battery life at high temperatures.

In the disultone-based compound of Formula 1 above, a substituent of the substituted C1-C5 alkylene group may be an unsubstituted or halogen-substituted C1-C20 alkyl group; an unsubstituted or halogen-substituted C2-C20 alkenyl group; an unsubstituted or halogen-substituted C2-C20 alkynyl group; an unsubstituted or halogen-substituted C3-C20 cycloalkenyl group; an unsubstituted or halogen-substituted C3-C20 heterocyclic (or saturated heterocyclic) group; an unsubstituted or halogen-substituted C6-C40 aryl group; an unsubstituted or halogen-substituted C2-C40 heteroaryl group; or a polar functional group having one or more heteroatoms.

In some embodiments, the substituent of the substituted C1-C5 alkylene group may be a halogen, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, or a pyridinyl group, but is not limited thereto. The substituent of the substituted C1-C5 alkylene group may be any suitable substituent available for an alkylene group in the art.

In some other embodiments, in the disultone-based compound of Formula 1 above, the substituent of the substituted C1-C5 alkylene group may be a polar functional group including a heteroatom, for example, at least one selected from oxygen, nitrogen, phosphorous, silicon, or boron.

For example, the polar functional group including the polar functional group having a heteroatom may be at least one selected from —F, —Cl, —Br, —I, —C(=O)OR$^{16}$, —OC(=O)R$^{16}$, —OR$^{16}$, —OC(=O)OR$^{16}$, —R$^{15}$OC(=O)OR$^{16}$, —C(=O)R$^{16}$, —R$^{15}$C(=O)R$^{16}$, —R$^{15}$OC(=O)R$^{16}$, —C(=O)—O—C(=O)R$^{16}$, —R$^{15}$C(=O)—O—C(=O)R$^{16}$, —SR$^{16}$, —R$^{15}$SR$^{16}$, —SSR$^{16}$, —R$^{15}$SSR$^{16}$, —S(=O)R$^{16}$, —R$^{15}$S(=O)R$^{16}$, —R$^{15}$C(=S)R$^{16}$, —R$^{15}$C(=S)SR$^{16}$, —R$^{15}$SO$_3$R$^{16}$, —SO$_3$R$^{16}$, —NNC(=S)R$^{16}$, —R$^{15}$NNC(=S)R$^{16}$, —R$^{15}$N=C=S, —NCO, —R$^{15}$—NCO, —NO$_2$, —R$^{15}$NO$_2$, —R$^{15}$SO$_2$R$^{16}$, —SO$_2$R$^{16}$,

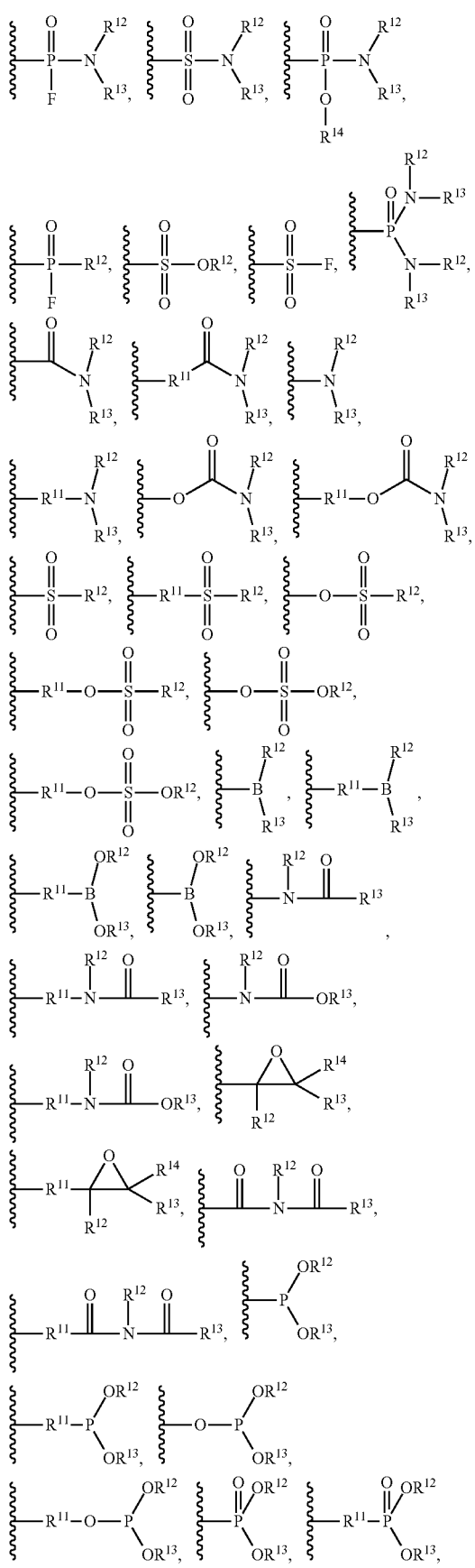

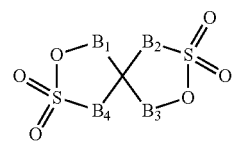

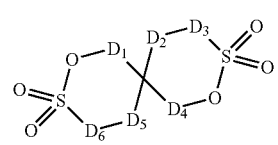 and

In the above formulae, $R^{11}$ and $R^{15}$ may be each independently an unsubstituted or halogen-substituted C1-C20 alkylene group; an unsubstituted or halogen-substituted C2-C20 alkenylene group; an unsubstituted or halogen-substituted C2-C20 alkynylene group; an unsubstituted or halogen-substituted C3-C12 cycloalkylene group; an unsubstituted or halogen-substituted C6-C40 arylene group; an unsubstituted or halogen-substituted C2-C40 heteroarylene group; an unsubstituted or halogen-substituted C7-C15 alkylarylene group; or an unsubstituted or halogen-substituted C7-C15 arakylene group, $R^{12}$, $R^{13}$, $R^{14}$, and $R^{16}$ may be each independently a hydrogen; a halogen; an unsubstituted or halogen-substituted C1-C20 alkyl group; an unsubstituted or halogen-substituted C2-C20 alkenyl group; an unsubstituted or halogen-substituted C2-C20 alkynyl group; an unsubstituted or halogen-substituted C3-C12 cycloalkyl group; an unsubstituted or halogen-substituted C6-C40 aryl group; an unsubstituted or halogen-substituted C2-C40 heteroaryl group; an unsubstituted or halogen-substituted C7-C15 alkylaryl group; an unsubstituted or halogen-substituted C7-C15 trialkylsilyl group; or an unsubstituted or halogen-substituted C7-C15 aralkyl group.

For example, in the above-mentioned polar functional group including the heteroatom, a halogen substituent of the alkyl group, the alkenyl group, the alkynyl group, the cycloalkyl group, the aryl group, the heteroaryl group, the alkylaryl group, the trialkylsilyl group, or the aralkyl group may be fluorine (F).

In some embodiments, the disultone-based compound of Formula 1 above may be represented by one of Formulae 2 or 3:

Formula 2

Formula 3

In Formulae 2 and 3, $B_1$, $B_2$, $B_3$, $B_4$, $D_1$, $D_2$, $D_3$, $D_4$, $D_5$, and $D_6$ may be each independently —C($E_1$)($E_2$)-; a carbonyl group; or a sulfinyl group, where $E_1$ and $E_2$ are each independently a hydrogen; a halogen; an unsubstituted or halogen-substituted C1-C20 alkyl group; an unsubstituted or halogen-substituted C2-C20 alkenyl group; an unsubstituted or halogen-substituted C2-C20 alkynyl group; an unsubstituted or halogen-substituted C3-C20 cycloalkenyl group; an unsubstituted or halogen-substituted C3-C20 heterocyclic (or saturated heterocyclic) group; an unsubstituted or halogen-substituted C6-C40 aryl group; or an unsubstituted or halogen-substituted C2-C40 heteroaryl group.

$E_1$ and $E_2$ may be, for example, each independently a hydrogen; a halogen; an unsubstituted or halogen-substituted C1-C10 alkyl group; an unsubstituted or halogen-substituted C6-C40 aryl group; or an unsubstituted or halogen-substituted C2-C40 heteroaryl group.

As another example, $E_1$ and $E_2$ may be each independently a hydrogen, F, Cl, Br, I, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, or a pyridinyl group.

As still another example, $E_1$ and $E_2$ may be each independently a hydrogen, fluorine (F), a methyl group, an ethyl group, a trifluoromethyl group, a tetrafluoroethyl group, or a phenyl group.

In some other embodiments, the disultone-based compound of Formula 1 above may be a compound represented by one of Formulae 4 to 5 below:

Formula 4

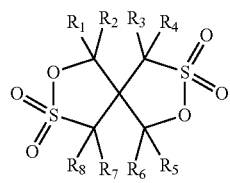

Formula 5

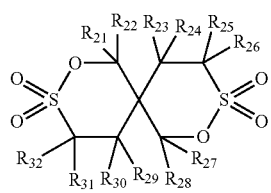

In Formulae 4 and 5 above, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ may be each independently a hydrogen; a halogen; an unsubstituted or halogen-substituted C1-C20 alkyl group; an unsubstituted or halogen-substituted C6-C40 aryl group; or an unsubstituted or halogen-substituted C2-C40 heteroaryl group.

As an example, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ in Formulae 4 and 5 above may be each independently a hydrogen, F, Cl, Br, I, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrole group, or a pyridine group.

As another example, $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ in Formulae 4 and 5 above may be each independently a hydrogen, F, a methyl group, an ethyl group, a propyl group, a trifluoromethyl group, a tetrafluoroethyl group, or a phenyl group.

In still other embodiments, the disultone-based compound of Formula 1 above may be represented by one of Formulae 6 to 17 below:

Formula 6

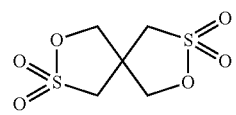

Formula 7

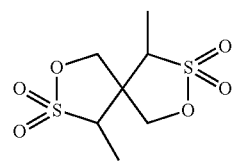

Formula 8

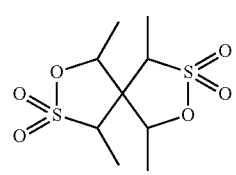

Formula 9

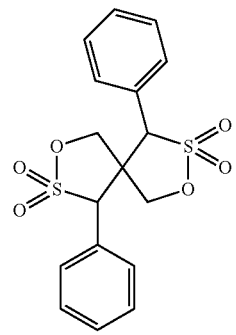

Formula 10

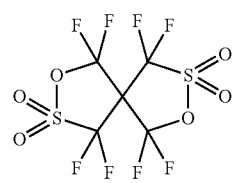

Formula 11

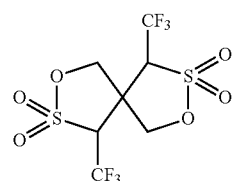

Formula 12

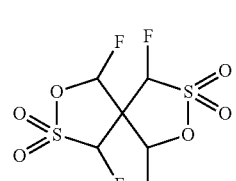

Formula 13

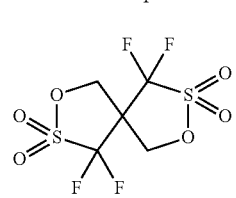

Formula 14
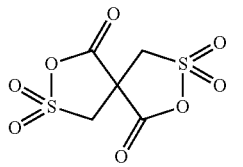

Formula 15
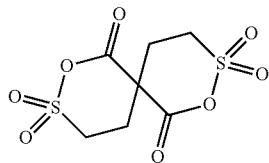

Formula 16
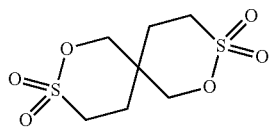

Formula 17
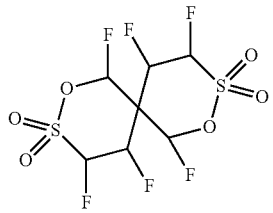

As used herein, in the expressions regarding the number of carbons, i.e., a capital "C" followed by a number, for example, "C1-C20", "C3-C20", or the like, the number such as "1", "3", or "20" following "C" indicates the number of carbons in a particular functional group. That is, a functional group may include from 1 to 20 carbon atoms. For example, a "C1-C4 alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

As used herein, a particular radical may refer to a mono-radical or a di-radical depending on the context. For example, when a substituent needs two binding sites for binding with the rest of the molecule, the substituent may be understood as a di-radical. For example, a substituent specified as an alkyl group that needs two binding sites may be a di-radical, such as —$CH_2$—, —$CH_2CH_2$—, or —$CH_2CH(CH_3)CH_2$—. The term "alkylene" clearly indicates that the radical is a di-radical.

As used herein, the terms "alkyl group" or "alkylene group" refers to a branched or unbranched aliphatic hydrocarbon group. For example, the alkyl group may be substituted or unsubstituted. Non-limiting examples of the alkyl group are a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, each of which may be optionally substituted or unsubstituted. In some embodiments, the alkyl group may have 1 to 6 carbon atoms. For example, a C1-C6 alkyl group may be a methyl group, an ethyl group, a propyl group, an isopropyl group, a butyl group, an iso-butyl group, a sec-butyl group, a pentyl group, a 3-pentyl group, or a hexyl group, but is not limited thereto.

As used herein, the term "cycloalkyl group" refers to a carbocyclic ring or ring system that is fully saturated. For example, the "cycloalkyl group" may refer to a cyclopropyl group, a cyclobutyl group, a cyclopentyl group, or a cyclohexyl group.

As used herein, the term "alkenyl group" refers to a hydrocarbon group including 2 to 20 carbon atoms with at least one carbon-carbon double bond. Non-limiting examples of the alkenyl group are an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexcenyl group, and a cycloheptenyl group. For example, these alkenyl groups may be substituted or unsubstituted. For example, an alkenyl group may have 2 to 40 carbon atoms.

As used herein, the term "alkynyl group" refers to a hydrocarbon group including 2 to 20 carbon atoms with at least one carbon-carbon triple bond. Non-limiting examples of the alkynyl group are an ethynyl group, a 1-propynyl group, a 1-butynyl group, and a 2-butynyl group. For examples, these alkynyl groups may be substituted or unsubstituted. For example, an alkynyl group may have 2 to 40 carbon atoms.

As used herein, the term "aromatic" refers to a ring or ring system with a conjugated π electron system, and may refer to a carbocyclic aromatic group (for example, a phenyl group, or a heterocyclic aromatic group, for example, a pyridine group). For example, an aromatic ring system as a whole may include a single ring or a fused polycyclic ring (i.e., a ring that shares adjacent atom pairs).

As used herein, the term "aryl group" refers to an aromatic ring or ring system (i.e., a ring fused from at least two rings, which shares two or more adjacent carbon atoms) of at least two rings including only carbon atoms in its backbone. When the aryl group is a ring system, each ring in the ring system may be aromatic. Non-limiting examples of the aryl group are a phenyl group, a biphenyl group, a naphthyl group, a phenanthrenyl group, and a naphthacenyl group. These aryl groups may be substituted or unsubstituted.

As used herein, the term "heteroaryl group" refers to an aromatic ring system with one or plural fused rings, in which at least one member of a ring is a heteroatom, i.e., not carbon. In the fused ring system, at least one heteroatom may be in one of the rings. For example, the heteroatom may be oxygen, sulfur, or nitrogen, but is not limited thereto. Non-limiting examples of the heteroaryl group are a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

As used herein, the terms "aralkyl group" or "alkylaryl group" refers to an aryl group linked to a substituent via an alkylene group, like a C7-C14 aralkyl group. Non-limiting examples of the aralkyl group or alkylaryl group are a benzyl group, a 2-phenylethyl group, a 3-phenylpropyl group, and a naphthylalkyl group. For example, the alkylene group may be a lower alkylene group (i.e., a C1-C4 alkylene group).

As used herein, the terms "cycloalkenyl group" refers to a non-aromatic carbocyclic ring or ring system with at least one double bond. For example, the cycloalkenyl group may be a cyclohexcenyl group.

As used herein, the terms "heterocyclic group" refers to a non-aromatic ring or ring system including at least one heteroatom in its cyclic backbone.

As used herein, the term "halogen" refers to a stable atom belonging to Group 17 of the periodic table of elements, for example, fluorine, chlorine, bromine, or iodine. For example, the halogen atom may be fluorine and/or chlorine.

As used herein, a substituent may be derived by substitution of at least one hydrogen atom in an unsubstituted mother group with another atom or a functional group. Unless stated otherwise, a substituted functional group refers to a functional group substituted with at least one substituent selected from a C1-C40 alkyl group, a C2-C40 alkenyl group, a C3-C40 cycloalkyl group, a C3-C40 cycloalkenyl group, a C1-C40 alkyl group, and a C7-C40 aryl group. When a functional group is "optionally" substituted, it means that the functional group may be substituted with such a substituent as listed above.

According to an embodiment, an organic electrolyte solution includes a lithium salt, an organic solvent, and any of the disultone-based compounds of Formula 1 above according to the previous embodiments as an additive.

An amount of the disultone-based compound of Formula 1 above as the additive may be from about 0.01 wt % to about 10 wt % based on a total weight of the organic electrolyte solution, but is not limited thereto. The amount of the disultone-based compound of Formula 1 may be appropriately adjusted when needed. For example, the amount of the disultone-based compound of Formula 1 above in the organic electrolyte solution may be from about 0.1 wt % to about 10 wt %, and in some embodiments, from about 0.1 wt % to about 7 wt %, and in some other embodiments, from about 0.1 wt % to about 5 wt %, and in still other embodiments, from about 0.2 wt % to about 5 wt %, and in yet other embodiments, from about 0.5 wt % to about 5 wt %, each based on the total weight of the organic electrolyte solution. For example, the amount of the disultone-based compound of Formula 1 above in the organic electrolyte solution may be from about 1 wt % to about 5 wt % based on the total weight of the organic electrolyte solution. In one embodiment, when the amount of the disultone-based compound of Formula 1 above is within these ranges, a lithium battery including the organic electrolyte solution has improved battery characteristics.

The organic solvent used in the organic electrolyte solution may be a low-boiling point solvent. The low-boiling point solvent refers to a solvent having a boiling point of about 200° C. or less at 1 atmosphere (760 mmHg).

For example, the organic solvent may include at least one selected from dialkylcarbonate, a cyclic carbonate, a linear or cyclic ester, a linear or cyclic amide, an alicyclic nitrile, a linear or cyclic ether, or a derivative thereof.

In some embodiments, the organic solvent may include at least one selected from dimethylcarbonate (DMC), ethylmethylcarbonate (EMC), methylpropylcarbonate, ethylpropylcarbonate, diethylcarbonate (DEC), dipropylcarbonate, propylenecarbonate (PC), ethylenecarbonate (EC), fluoroethylenecarbonate (FEC), butylenecarbonate, ethylpropionate, ethylbutyrate, acetonitrile, succinonitrile (SN), dimethylsulfoxide, dimethylformamide, dimethylacetamide, γ-valerolactone, γ-butyrolactone, or tetrahydrofuran, but is not limited thereto. For example, the organic solvent may be any suitable solvent having a low-boiling point available in the art.

A concentration of the lithium salt used in the organic electrolyte solution may be from about 0.01 M to about 2.0 M, but is not limited thereto. The concentration of the lithium salt in the organic electrolyte solution may be appropriately adjusted when needed. In one embodiment, when the concentration of the lithium salt is within this range, a lithium battery including the organic electrolyte solution has further improved battery characteristics.

The lithium salt used in the organic electrolyte solution is not specifically limited. For example, any suitable lithium salt available in the art may be used. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each an integer from 1 to 20), LiCl, LiI, or a combination thereof.

The organic electrolyte solution may be in a liquid or gel phase. The organic electrolyte solution may be prepared by adding a lithium salt and the disultone-based compound of Formula 1 as described above into an organic solvent as described above.

According to another embodiment, a lithium battery includes a cathode, an anode, and any of the organic electrolyte solutions according to the above-described embodiments. The lithium battery may be any type of a lithium battery, for example, a lithium primary battery, or a lithium secondary battery such as a lithium ion battery, a lithium ion polymer battery, or a lithium sulfur battery.

For example, the anode of the lithium battery may include graphite. The lithium battery may have a high voltage of about 4.35 V or greater.

For example, the lithium battery may be manufactured using a method described below.

First, a cathode is prepared.

For example, a cathode active material, a conducting agent, a binder, and a solvent are mixed to prepare a cathode active material composition. The cathode active material composition may be directly coated on a metallic current collector to prepare a cathode plate. Alternatively, the cathode active material composition may be cast on a separate support to form a cathode active material film, which may then be separated from the support and laminated on a metallic current collector to prepare a cathode plate. The cathode is not limited to the examples described above, and may be one of a variety of suitable materials and compositions prepared using a variety of suitable methods.

The cathode active material may be any suitable one available in the art, for example, a lithium-containing metal oxide. For example, the cathode active material may be at least one composite oxide of lithium and a metal selected from cobalt, manganese, nickel, and a combination thereof. For example, the cathode active material may be a compound represented by one of the following formulae: $Li_aA_{1-b}B_bD_2$ (where $0.90 \le a \le 1.8$, and $0 \le b \le 0.5$); $Li_aE_{1-b}B_bO_{2-c}D_c$ (where $0.90 \le a \le 1.8$, $0 \le b \le 0.5$, $0 \le c \le 0.05$); $LiE_{2-b}B_bO_{4-c}D_c$ (where $0 \le b \le 0.5$, $0 \le c \le 0.05$); $Li_aNi_{1-b-c}Co_bB_cD_\alpha$ (where $0.90 \le a \le 1.8$, $0 \le b \le 0.5$, $0 \le c \le 0.05$, $0 < \alpha \le 2$); $Li_aNi_{1-b-c}Co_bB_cO_{2-\alpha}F_\alpha$ (where $0.90 \le a \le 1.8$, $0 \le b \le 0.5$, $0 \le c \le 0.05$, $0 < \alpha < 2$); $Li_aNi_{1-b-c}Co_bB_cO_{2-\alpha}F_2$ (where $0.90 \le a \le 1.8$, $0 \le b \le 0.5$, $0 \le c \le 0.05$, $0 < \alpha < 2$); $Li_aNi_{1-b-c}Mn_bB_cD_\alpha$ (where $0.90 \le a \le 1.8$, $0 \le b \le 0.5$, $0 \le c \le 0.05$, $0 < \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, $0 < \alpha < 2$); $Li_aNi_{1-b-c}Mn_bB_cO_{2-\alpha}F_2$ (where $0.90 \le a \le 1.8$, $0 \le b \le 0.5$, $0 \le c \le 0.05$, $0 < \alpha < 2$); $Li_aNi_bE_cG_dO_2$ (where $0.90 \le a \le 1.8$, $0 \le b \le 0.9$, $0 \le c \le 0.5$, $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, $0.001 \le e \le 0.1$); $Li_aNiG_bO_2$ (where $0.90 \le a \le 1.8$, $0.001 \le b \le 0.1$); $Li_aCoG_bO_2$ (where $0.90 \le a \le 1.8$, $0.001 \le b \le 0.1$); $Li_aMnG_bO_2$ (where $0.90 \le a \le 1.8$, $0.001 \le b \le 0.1$); $Li_aMn_2G_bO_4$ (where $0.90 \le a \le 1.8$, $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); or $LiFePO_4$:

In the formulae above, A may be selected from nickel (Ni), cobalt (Co), manganese (Mn), and combinations thereof; B may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from oxygen (O), fluorine (F), sulfur (S), phosphorus (P), and combinations thereof; E may be selected from cobalt (Co), manganese (Mn), and combinations thereof; F may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; I may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

In some embodiments, the cathode active material may be $LiCoO_2$, $LiMn_xO_{2x}$ (x=1 or 2), $LiNi_{1-x}Mn_xO_{2x}$ (0<x<1), $LiNi_{1-x-y}Co_xMn_yO_2$ (0≤x≤0.5, 0≤y≤0.5), or $LiFePO_4$.

The compounds listed above as cathode active materials may have a coating layer on surfaces thereof. Alternatively, a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any suitable method that does not adversely affect the physical properties of the cathode active material when a compound of the coating element is used. For example, the coating layer may be formed using a spray coating method, a dipping method, or the like. This is obvious to those of skill in the art, and thus a detailed description thereof will be omitted.

The conducting agent may be carbon black or graphite particulates, but is not limited thereto. Any material available as a suitable conducting agent in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a suitable binding agent in the art may be used.

Non-limiting examples of the solvent are N-methyl-pyrrolidone, acetone, and water. Any material available as a suitable solvent in the art may be used.

The amount of each of the cathode active material, the conducting agent, the binder, and the solvent may be in ranges that are commonly used in lithium batteries. At least one of the conducting agent, the binder or the solvent may be omitted according to the use and the structure of the lithium battery.

Next, an anode may be prepared.

For example, an anode active material, a conducting agent, a binder, and a solvent are mixed to prepare an anode active material composition. The anode active material composition is directly coated on a metallic current collector and dried to prepare an anode plate. Alternatively, the anode active material composition may be cast on a separate support to form an anode active material film, which may then be separated from the support and laminated on a metallic current collector to prepare an anode plate.

The anode active material may be any suitable anode active material for a lithium battery available in the art. For example, the anode active material may include at least one selected from lithium metal, a metal that is alloyable with lithium, a transition metal oxide, a non-transition metal oxide, or a carbonaceous material.

Examples of the metal alloyable with lithium are Si, Sn, Al, Ge, Pb, Bi, Sb, a Si—Y alloy (where Y is an alkali metal, an alkaline earth metal, a Group XIII element, a Group XIV element, a transition metal, a rare earth element, or a combination thereof except for Si), and a Sn—Y alloy (where Y is an alkali metal, an alkaline earth metal, a Group XIII element, a Group XIV element, a transition metal, a rare earth element, or a combination thereof except for Sn). Y may be magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Non-limiting examples of the transition metal oxide are a lithium titanium oxide, a vanadium oxide, and a lithium vanadium oxide.

For example, the non-transition metal oxide may be $SnO_2$, or $SiO_x$ (0<x<2).

Examples of the carbonaceous material are crystalline carbon, amorphous carbon, and mixtures thereof. Examples of the crystalline carbon are graphite, such as natural graphite or artificial graphite that are in plate, flake, spherical or fibrous form. Examples of the amorphous carbon are soft carbon (carbon sintered at low temperatures), hard carbon, mesophase pitch carbides, sintered corks, and the like.

The conducting agent, the binder and the solvent used for the anode active material composition may be the same as those used for the cathode active material composition.

The amount of each of the anode electrode active material, the conducting agent, the binder, and the solvent may be those levels generally used in lithium batteries. At least one of the conducting agent, the binder and the solvent may be omitted according to the use and the structure of the lithium battery.

Next, a separator to be disposed between the cathode and the anode may be prepared.

The separator for the lithium battery may be any suitable separator that is commonly used in lithium batteries. The separator may have low resistance to migration of ions in an electrolyte and have an excellent organic electrolyte solution-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any suitable material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an organic electrolyte solution as described in the previous embodiments may be prepared.

Figure 3:
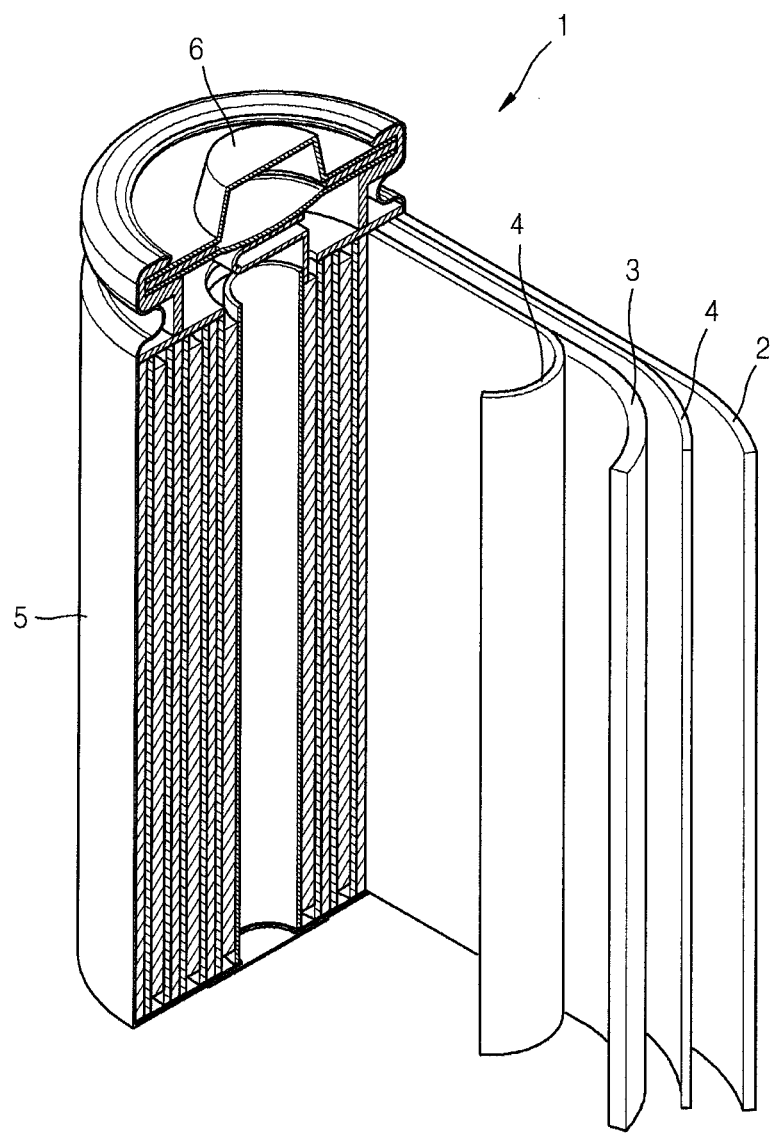
FIG. 3 is a schematic view of a lithium battery according to an exemplary embodiment of the present invention.

Referring to FIG. 3, a lithium battery 1 includes a cathode 3, an anode 2, and a separator 4. The cathode 3, the anode 2 and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical case, a rectangular case, or a thin-film case. For example, the lithium battery may be a thin-film battery. The lithium battery may be a lithium ion battery.

The separator may be interposed between the cathode and the anode to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smart phone, an electric vehicle, or the like.

The lithium battery may have improved battery life and high rate characteristics, and thus may be applicable in an electric vehicle (EV), for example, in a hybrid vehicle such as a plug-in hybrid electric vehicle (PHEV). The lithium battery may be applicable to the high-power storage field, for example, in an electric bicycle, a power tool, or the like.

Thereinafter, one or more embodiments of the present invention will be described in more detail with reference to the following examples. However, these examples are not intended to limit the scope of the one or more embodiments of the present invention.

Synthesis of Additives

Preparation Example 1

Synthesis of Compound of Formula 6 Below

A compound represented by Formula 6 below was prepared according to Reaction Scheme 1 below.

Reaction Scheme 1

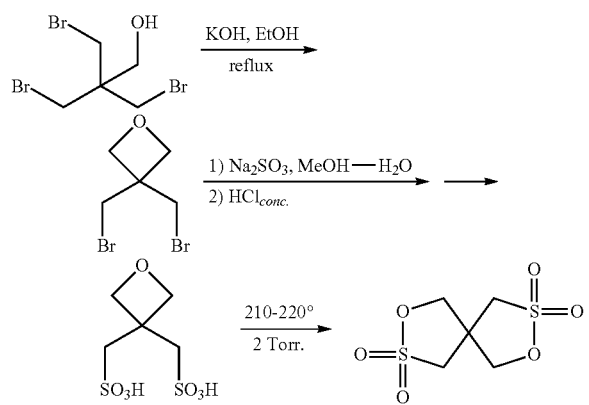

A solution of 10.34 g (0.156 mole) of potassium hydroxide dissolved in 200 mL of ethanol was dropwise added into a solution of 50 g (0.154 mole) of pentaerythritol tribromide dissolved in 200 mL of ethanol, and the resulting mixture was refluxed for about 30 minutes. The resulting reaction product was cooled down to room temperature, and then filtered to remove KBr, followed by evaporating ethanol. The residue was distilled in vacuum to obtain 28 g (0.115 mole) of 3,3-bis(bromomethyl)oxacyclobutane (Yield: 75%, b.p.: 72-78° C. @ 10 mmHg).

1H NMR (400 MHz, CDCl$_3$): δ 3.84 (s, 4H), 4.42 (s, 4H), 4.58 (s, 4H).

28 g (0.115 mole) of bis(bromomethyl)oxacyclobutane dissolved in a mixed solvent of 94 mL of methanol and 28 mL of water was dropwise added into a solution of 44.8 g (0.358 mol) of Na$_2$SO$_3$ dissolved in 252 mL of water. The resulting mixture was refluxed for about 3.5 hours, and the solvent was removed under vacuum. The residue was treated with 200 ml of conc. HCl, and filtered to remove NaCl thereby obtaining a sulfonic acid solution, which was then evaporated in a vacuum. The resulting residue oil was heated at about 2 mmHg at about 210-220° C. for about 2 hours to obtain a black mass, which was then extracted with boiling dioxane and then filtered in the hot state. The filtrate was cooled down to crystallize 10 g of disulfone (Yield: 38%, m.p.: 244-246° C.).

1H NMR (400 MHz, DMSO-d6): δ 3.87 (s, 2H), 3.88 (s, 2H), 4.58 (s, 4H).

Formula 6

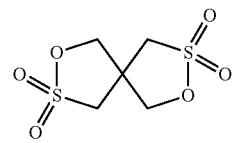

Preparation of Organic Electrolyte Solutions

Example 1

0.90 M LiPF$_6$ as a lithium salt, and 0.5 wt % of a compound of Formula 6 below were added into a mixed solvent of ethylenecarbonate (EC), ethylmethylcarbonate (EMC), and diethylcarbonate (DEC) in a volume ratio of 3:5:2 to obtain an organic electrolyte solution.

Formula 6

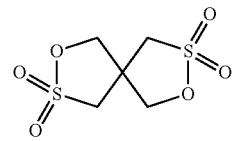

Example 2

An organic electrolyte solution was prepared in the same manner as in Example 1, except that the amount of the compound of Formula 6 as an additive was changed to about 1 wt %.

Example 3

An organic electrolyte solution was prepared in the same manner as in Example 1, except that the amount of the compound of Formula 6 as an additive was changed to about 2.5 wt %.

Comparative Example 1

An organic electrolyte solution was prepared in the same manner as in Example 1, except that the compound of Formula 6 as an additive was not used.

Comparative Example 2

An organic electrolyte solution was prepared in the same manner as in Example 1, except that 2.5 wt % of propane sultone represented by Formula 18 below was used as the additive, instead of the compound of Formula 6, Formula 18

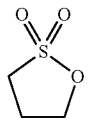

Manufacture of Lithium Batteries

Example 4

Manufacture of an Anode

About 98 wt % of artificial graphite (BSG-L, available from Tianjin BTR New Energy Technology Co., Ltd.), about 1.0 wt % of styrene-butadiene rubber (SBR) binder (available from ZEON), and about 1.0 wt % of carboxymethylcellulose (CMC, available from NIPPON A&L) were mixed with distilled water and stirred using a mechanical stirrer for about 60 minutes to prepare an anode active material slurry. The anode active material slurry was coated on a 10 μm-thick Cu current collector to a thickness of about 60 μm with a doctor blade. Then, the resultant was dried in a hot-air dryer at about 100° C. for about 0.5 hour, and then at about 120° C. in a vacuum for 4 hours, followed by roll-pressing to manufacture an anode plate.

Manufacture of a Cathode

About 97.45 wt % of LiCoO$_2$, about 0.5 wt % of artificial graphite powder (SFG6, available from Timcal) as a conducting agent, about 0.7 wt % of carbon black (Ketjen black, available from ECP), about 0.25 wt % of modified acrylonitrile rubber (BM-720H, available from Zeon Corporation), about 0.9 wt % of polyvinylidenefluoride (PVdF, S6020, available from Solvay), and about 0.2 wt % of polyvinylidenefluoride (PVdF, S5130, available from Solvay) were mixed with N-methyl-2-pyrolidone as a solvent and stirred for about 30 minutes to prepare a cathode active material slurry. The cathode active material slurry was coated on a 20 μm-thick aluminum (Al) current collector to a thickness of about 60 μm with a doctor blade. Then, the resultant was dried in a hot-air dryer at about 100° C. for about 0.5 hour, and then at about 120° C. in a vacuum for 4 hours, followed by roll-pressing to manufacture a cathode plate.

A 14 μm-thick polyethylene separator with a ceramic coating on a surface facing the cathode, and the organic electrolyte solution of Example 1 above were used to manufacture a lithium battery.

Examples 5 and 6

Lithium batteries were manufactured in the same manner as in Example 4, except that the organic electrolyte solutions of Examples 2 and 3 were used respectively instead of the organic electrolyte solution of Example 1.

Comparative Examples 3 and 4

Lithium batteries were manufactured in the same manner as in Example 4, except that the organic electrolyte solutions of Comparative Examples 1 and 2 were used respectively instead of the organic electrolyte solution of Example 1.

Evaluation Example 1

Evaluation of High-Temperature (45° C.) Charge-Discharge Characteristics

The lithium batteries of Examples 4 to 6, Comparative Examples 3 and 4 were each charged at a constant current of 0.1 C rate at about 25° C. to a voltage of about 4.35 V, and then charged at a constant voltage of about 4.35 V to a current of about 0.05 C (cut-off current), followed by discharging with a constant current of 0.1 C until the voltage reached about 2.8 V (formation process, 1st cycle).

Each of the lithium batteries through the $1^{st}$ cycle of the formation process was charged at a constant current of 0.2 C rate at about 25° C. to a voltage of about 4.35 V, and then charged at a constant voltage of about 4.35 V to a current of 0.05 C (cut-off current), followed by discharging with a constant current of 0.2 C until the voltage reached about 2.8 V (formation process, $2^{nd}$ cycle).

The lithium battery through the 2nd cycle of the formation process was charged at a constant current of 1.0 C rate at about 25° C. to a voltage of about 4.35 V, and then charged at a constant voltage of about 4.35 V to a current of 0.05 C (cut-off current), followed by discharging with a constant current of about 1.0 C until the voltage reached about 2.75 V. This cycle of charging and discharging was repeated 300 times.

A rest time of about 10 minutes was allowed after each charge and discharge cycle.

Figure 2:
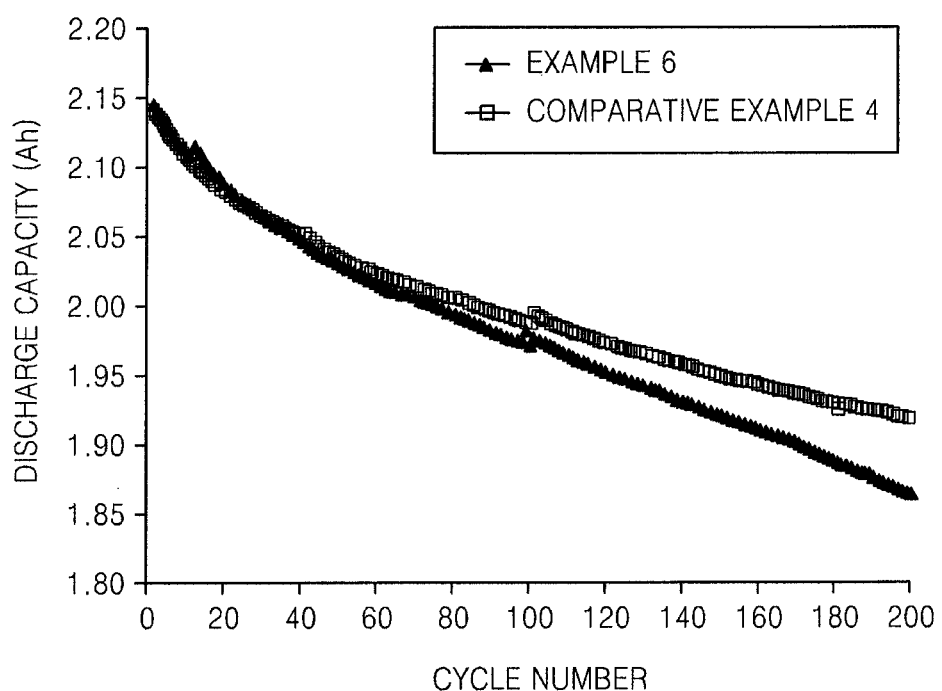
FIG. 2 is a graph illustrating lifetime characteristics of lithium batteries of Example 6 and Comparative Example 4.

Some of the charge-discharge test results are shown in Table 1 and FIGS. 1 and 2. A capacity retention at $300^{th}$ cycles may be defined using Equation 1 below.

Capacity retention rate=[Discharge capacity at $200^{th}$ cycle/Discharge capacity at $1^{st}$ cycle]×100     Equation 1

TABLE 1

| Example | Discharge capacity at $200^{th}$ cycle | Capacity retention rate at $200^{th}$ cycle [%] |
|---|---|---|
| Example 4 | 120 mAh/g | 77.2 |
| Example 5 | 122 mAh/g | 76.4 |
| Example 6 | 1921 mAh | 89.6 |
| Comparative Example 3 | 114 mAh/g | 73.3 |
| Comparative Example 4 | 1865 mAh | 86.9 |

Referring to Table 1 and FIG. 1, the lithium batteries of Examples 4 to 6 including the compound of Formula 6 according to an embodiment of the present invention as an additive were found to have significantly improved high-temperature discharge capacities and improved battery life, compared to the lithium batteries of Comparative Examples 3 and 4 including no additive and the conventional additive, respectively.

As described above, according to one or more of the above embodiments of the present invention, the battery life of a lithium battery may be improved by using an organic electrolyte solution including a disultone-based additive having a novel structure.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. An organic electrolyte solution comprising:
a lithium salt;
an organic solvent; and
a disultone-based compound represented by Formula 1:

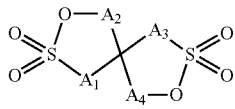

Formula 1 wherein $A_1$, $A_2$, $A_3$, and $A_4$ are each independently a substituted or unsubstituted C1-C5 alkylene group; a carbonyl group; or a sulfinyl group.

2. The organic electrolyte solution of claim 1, wherein at least one of $A_1$, $A_2$, $A_3$, or $A_4$ is an unsubstituted C1-C5 alkylene group or a substituted C1-C5 alkylene group substituted with one or more of an unsubstituted or halogen-substituted C1-C20 alkyl group; an unsubstituted or halogen-substituted C2-C20 alkenyl group; an unsubstituted or halogen-substituted C2-C20 alkynyl group; an unsubstituted or halogen-substituted C3-C20 cycloalkenyl group; an unsubstituted or halogen-substituted C3-C20 saturated heterocyclic group; an unsubstituted or halogen-substituted C6-C40 aryl group; an unsubstituted or halogen-substituted C2-C40 heteroaryl group; or a polar functional group including one or more heteroatoms.

3. The organic electrolyte solution of claim 1, wherein at least one of $A_1$, $A_2$, $A_3$, or $A_4$ is an unsubstituted C1-C5 alkylene group or a substituted C1-C5 alkylene group substituted with a halogen, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, or a pyridinyl group.

4. The organic electrolyte solution of claim 2, wherein the substituted C1-C5 alkylene group is substituted with a polar functional group including one or more heteroatoms, the polar functional group selected from the group consisting of —F, —Cl, —Br, —I, —C($=$O)OR$^{16}$, —OR$^{16}$, —OC($=$O)OR$^{16}$, —R$^{15}$OC($=$O)OR$^{16}$, —C($=$O)R$^{16}$, —R$^{15}$C($=$O)R$^{16}$, —OC($=$O)R$^{16}$, —R$^{15}$OC($=$O)R$^{16}$, —C($=$O)—O—C($=$O)R$^{16}$, —R$^{15}$C($=$)—O—C($=$O)R$^{16}$, —SR$^{16}$, —R$^{15}$SR$^{16}$, —SSR$^{16}$, —R$^{15}$SSR$^{16}$, —S($=$O)R$^{16}$, —R$^{15}$S($=$O)R$^{16}$, —R$^{15}$C($=$S)R$^{16}$, —R$^{15}$C($=$S)SR$^{16}$, —R$^{15}$SO$_3$R$^{16}$, —SO$_3$R$^{16}$, —NNC($=$S)R$^{16}$, —R$^{15}$NNC($=$S)R$^{16}$, —R$^{15}$N$=$C$=$S, —NCO, —R$^{15}$—NCO, —NO$_2$, —R$^{15}$NO$_2$, —R$^{15}$SO$_2$R$^{16}$, —SO$_2$R$^{16}$,

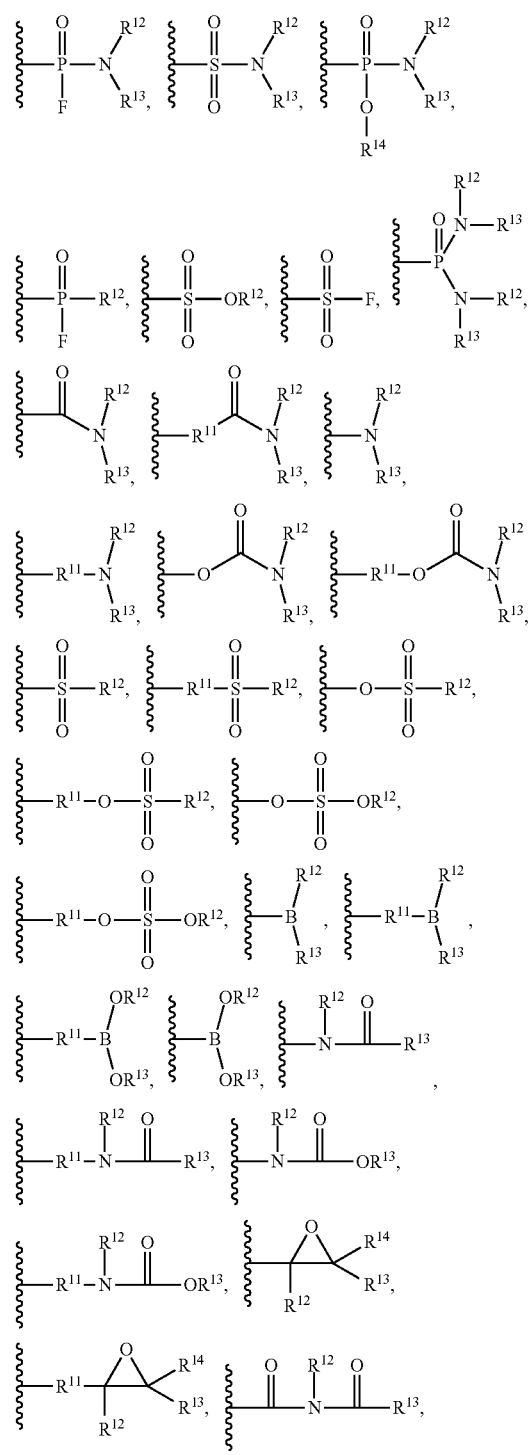

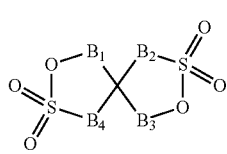

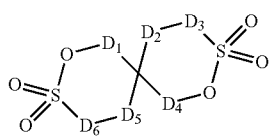

wherein:
$R^{11}$ and $R^{15}$ are each independently an unsubstituted or halogen-substituted C1-C20 alkylene group; an unsubstituted or halogen-substituted C2-C20 alkenylene group; a unsubstituted or halogen-substituted C2-C20 alkynylene group; an unsubstituted or halogen-substituted C3-C12 cycloalkylene group; an unsubstituted or halogen-substituted C6-C40 arylene group; an unsubstituted or halogen-substituted C2-C40 heteroarylene group; an unsubstituted or halogen-substituted C7-C15 alkylarylene group; or an unsubstituted or halogen-substituted C7-C15 arakylene group; and $R^{12}$, $R^{13}$, $R^{14}$, and $R^{16}$ are each independently a hydrogen; a halogen; an unsubstituted or halogen-substituted C1-C20 alkyl group; an unsubstituted or halogen-substituted C2-C20 alkenyl group; an unsubstituted or halogen-substituted C2-C20 alkynyl group; an unsubstituted or halogen-substituted C3-C12 cycloalkyl group; an unsubstituted or halogen-substituted C6-C40 aryl group; an unsubstituted or halogen-substituted C2-C40 heteroaryl group; an unsubstituted or halogen-substituted C7-C15 alkylaryl group; an unsubstituted or halogen-substituted C7-C15 trialkylsilyl group; or an unsubstituted or halogen-substituted C7-C15 aralkyl group.

5. The organic electrolyte solution of claim 1, wherein the disultone-based compound is represented by one of Formulae 2 or 3:

Formula 2

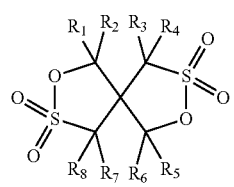

Formula 3

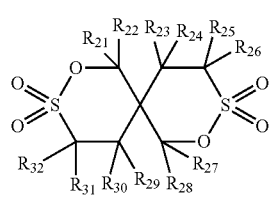

wherein $B_1$, $B_2$, $B_3$, $B_4$, $D_1$, $D_2$, $D_3$, $D_4$, $D_5$, and $D_6$ are each independently —C($E_1$)($E_2$)—; a carbonyl group; or a sulfinyl group, where $E_1$ and $E_2$ are each independently a hydrogen; a halogen; a unsubstituted or halogen-substituted C1-C20 alkyl group; an unsubstituted or halogen-substituted C2-C20 alkenyl group; an unsubstituted or halogen-substituted C2-C20 alkynyl group; an unsubstituted or halogen-substituted C3-C20 cycloalkenyl group; an unsubstituted or halogen-substituted C3-C20 saturated heterocyclic group; an unsubstituted or halogen-substituted C6-C40 aryl group; or an unsubstituted or halogen-substituted C2-C40 heteroaryl group.

6. The organic electrolyte solution of claim 5, wherein $E_1$ and $E_2$ are each independently a hydrogen; a halogen; an unsubstituted or halogen-substituted C1-C10 alkyl group; an unsubstituted or halogen-substituted C6-C40 aryl group; or an unsubstituted or halogen-substituted C2-C40 heteroaryl group.

7. The organic electrolyte solution of claim 5, wherein $E_1$ and $E_2$ are each independently a hydrogen, F, Cl, Br, I, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, or a pyridinyl group.

8. The organic electrolyte solution of claim 1, wherein the disultone-based compound is represented by one of Formulae 4 or 5:

Formula 4

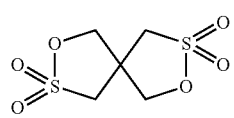

Formula 5 wherein $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently a hydrogen; a halogen; an unsubstituted or halogen-substituted C1-C20 alkyl group; an unsubstituted or halogen-substituted C6-C40 aryl group; or an unsubstituted or halogen-substituted C2-C40 heteroaryl group.

9. The organic electrolyte solution of claim 8, wherein $R_1$, $R_2$, $R_3$, $R_4$, $R_5$, $R_6$, $R_7$, $R_8$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$ are each independently a hydrogen, F, Cl, Br, I, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, or a pyridinyl group.

10. The organic electrolyte solution of claim 1, wherein the disultone-based compound is represented by one of Formulae 6 to 17:

Formula 6

-continued

Formula 7
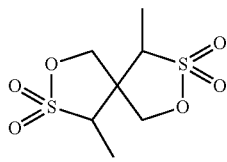

Formula 8
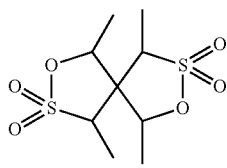

Formula 9
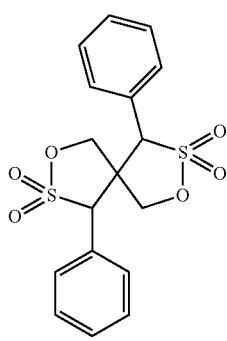

Formula 10
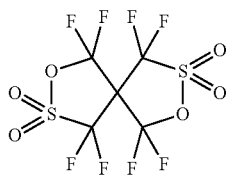

Formula 11
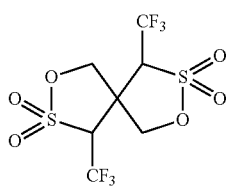

Formula 12
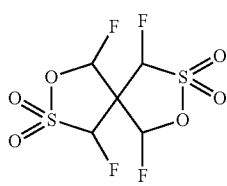

Formula 13
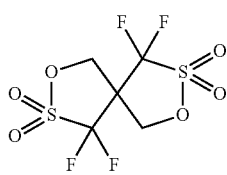

Formula 14
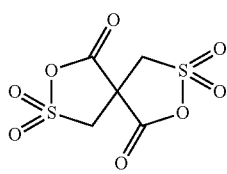

-continued

Formula 15
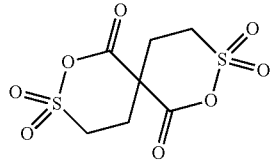

Formula 16
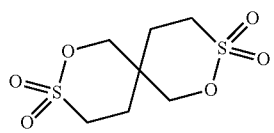

Formula 17
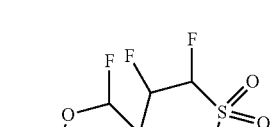

11. The organic electrolyte solution of claim 1, wherein the organic electrolyte solution comprises from about 0.01 wt % to about 10 wt % of the disultone-based compound.

12. The organic electrolyte solution of claim 1, wherein the organic solvent comprises a low-boiling point solvent.

13. The organic electrolyte solution of claim 1, wherein the organic electrolyte solution comprises from about 0.01 M to about 5.0 M of the lithium salt.

14. A lithium battery comprising:
a cathode;
an anode; and
an organic electrolyte solution comprising:
a lithium salt;
an organic solvent; and
an additive comprising a disultone-based compound represented by Formula 1:

Formula 1
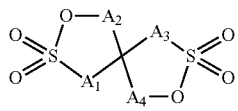

wherein $A_1$, $A_2$, $A_3$, and $A_4$ are each independently a substituted or unsubstituted C1-C5 alkylene group; a carbonyl group; or a sulfinyl group.

15. The lithium battery of claim 14, wherein the disultone-based compound is represented by one of Formulae 6 to 17:

Formula 6
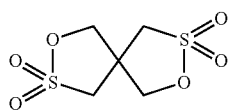

-continued
Formula 7
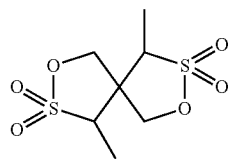
Formula 8
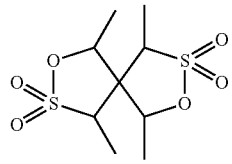
Formula 9
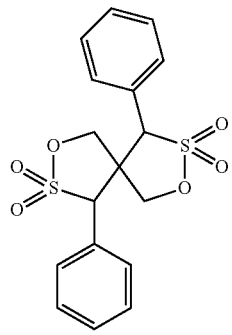
Formula 10
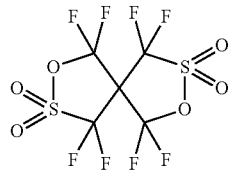
Formula 11
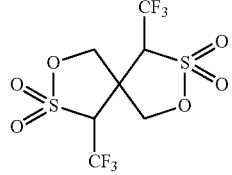
Formula 12
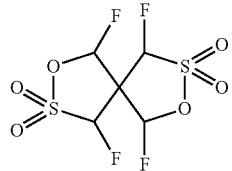
Formula 13
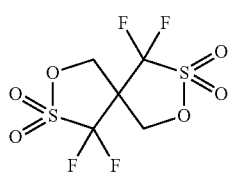
Formula 14
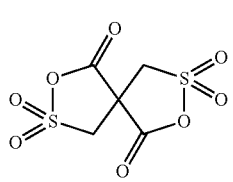
Formula 15
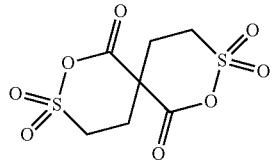
Formula 16
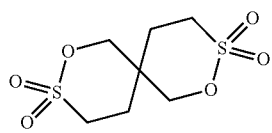
Formula 17
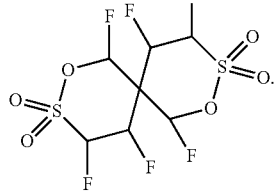
16. The lithium battery of claim 15, wherein the anode comprises graphite.
17. The lithium battery of claim 15, wherein the lithium battery has a high voltage of about 3.8 V or greater.
* * * * *